(12) United States Patent
Stuckman et al.

(10) Patent No.: US 6,273,815 B1
(45) Date of Patent: Aug. 14, 2001

(54) VIRTUAL ELECTRONIC PET AND METHOD FOR USE THEREWITH

(76) Inventors: Katherine C. Stuckman; Bruce E. Stuckman, both of 1940 Wynnfield Dr., Algonquin, IL (US) 60102

( * ) Notice: Subject to any disclaimer, the term of this patent is extended or adjusted under 35 U.S.C. 154(b) by 0 days.

(21) Appl. No.: 09/328,275

(22) Filed: Jun. 8, 1999

(51) Int. Cl.[7] ....................................... A63F 9/22
(52) U.S. Cl. ................ 463/9; 434/322; 434/238
(58) Field of Search .................. 463/1, 9, 43–44, 463/36, 30; 434/307 R, 308, 309, 236, 238, 262, 295, 322, 323

(56) References Cited

U.S. PATENT DOCUMENTS 6,171,189 * 1/2001 Katano .................... 463/43

OTHER PUBLICATIONS

Tama Gotchi Instructions, 1997, by Bandai, 2 pages.
Nano Puppy Instructions, by Playmates, No date, 2 pages.
Gigapets Instructions, 1997, by Tiger Electronics, 2 pages.

* cited by examiner

Primary Examiner—Mark Sager
(74) Attorney, Agent, or Firm—Bruce E. Stuckman

(57) ABSTRACT

A virtual electronic pet is capable of performing a plurality of activities and capable of displaying a plurality of behaviors, at least one of the plurality of behaviors dependent upon performance of at lest one of the plurality of activities. An actual name is retrieved from a name database. A name signal, indicating a guessed name, is generated in response to the actions of a user. The actual name guessed name are compared to determine if the guessed name matches the actual name. At least one of the plurality of behaviors is displayed if the guessed name matches the actual name. Further guessing of the name is prohibited unit a time period expires.

15 Claims, 11 Drawing Sheets

VIRTUAL ELECTRONIC PET AND METHOD FOR USE THEREWITH

FIELD OF THE INVENTION

The present invention relates to interactive electronic games and in particular to virtual electronic pets that are capable of performing a plurality of activities and capable of displaying a plurality of behaviors, at least one of the plurality of behaviors dependent upon performance of at least one of the plurality of activities.

BACKGROUND OF THE INVENTION

A recent addition to the field of interactive electronic games is the highly popular virtual electronic pet. These devices allow a player the experience, in the context of an interactive game, of owning a pet. After the virtual pet is born, it can be played with. However, at random intervals, the pet displays a variety of behaviors that signify to the user that certain activities such as feeding, sleep, and medical care need to be initiated to keep the pet happy and healthy. If the pet does not receive the required care and attention, then the virtual pet "dies" and the game ends.

While a wide variety of such virtual pets are currently available in the marketplace, each of these devices has either the same or similar functionality. The need exists, therefore, for improved virtual pets with additional functions and features to provide ever more discerning consumers with enhanced games.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE PRESENTLY PREFERRED EMBODIMENTS

The present invention provides numerous advantages over the prior art. Several embodiments of the present invention provide the user the experience of guessing the name of the virtual pet. This function is tied to the game so that the user must keep the virtual pet "alive" by proper care and attention in able to make repeated guesses and receive clues as to the pet's name. Other embodiments present additional enhancements and features that will be apparent to one of ordinary skill in the art upon review of the attached description.

Figure 1:
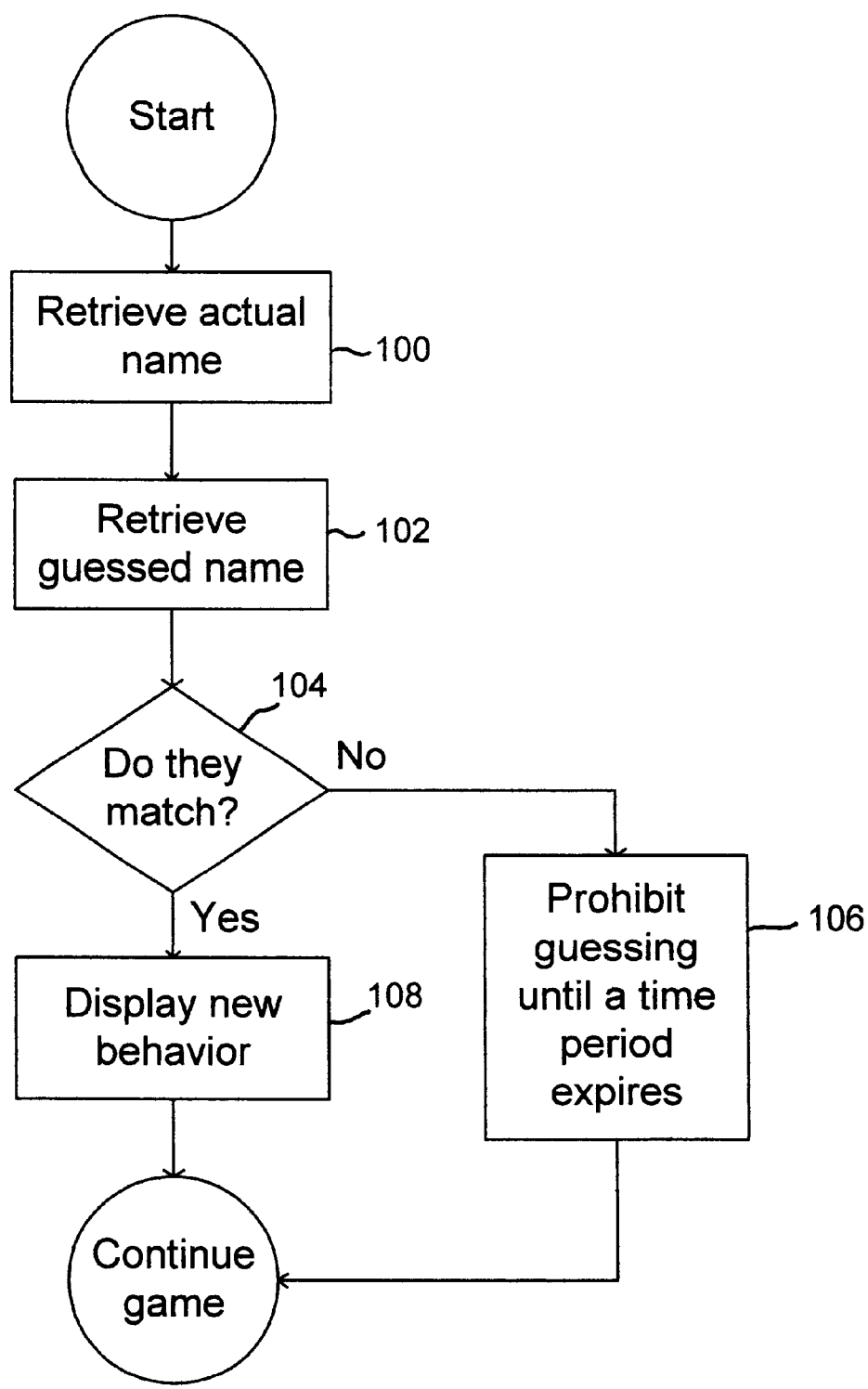
FIG. 1 presents a flowchart representation of a method used in accordance with various embodiments of the present invention.

FIG. 1 presents a flowchart representation of a method used in accordance with various embodiments of the present invention. In particular, this method can be used in a virtual electronic pet having a user interface, the virtual electronic pet capable of performing a plurality of activities and capable of displaying a plurality of behaviors, at least one of the plurality of behaviors dependent upon performance of at least one of the plurality of activities. The method begins in step 100 by retrieving an actual name from a name database. Name signals, indicating a guessed name, are generated in response to the actions of a user as shown in step 102. The actual name and the guessed name are compared to determine if the guessed name matches the actual name as shown in decision block 104. If the guessed name matches the actual name the method proceeds to step 108 where at least one of the plurality of behaviors is displayed. If the guessed name does not match the actual name, the method proceeds to step 106 and the user is prohibited from further guessing of the name until a time period expires. In either instance, the game continues.

Figure 2:
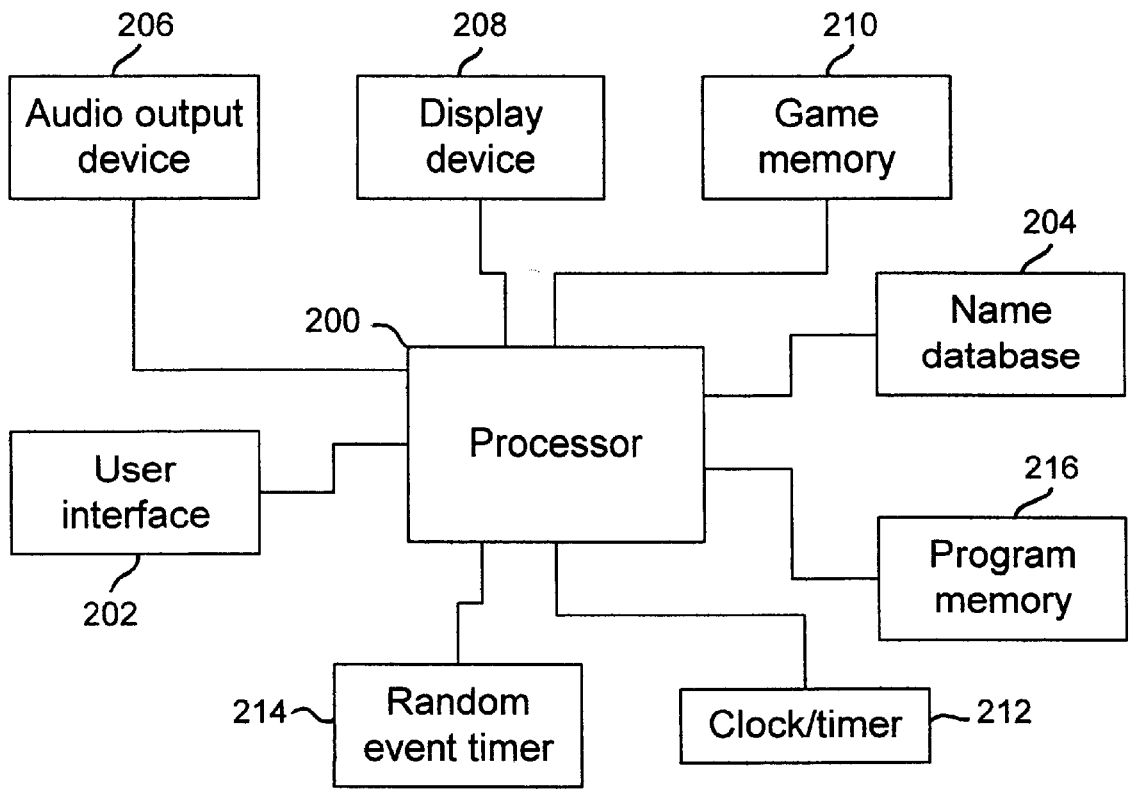
FIG. 2 presents a block diagram representation of a virtual electronic pet in accordance with various embodiments of the present invention.

FIG. 2 presents a block diagram representation of a virtual electronic pet in accordance with various embodiments of the present invention. In particular, the virtual electronic pet is capable of performing a plurality of activities and capable of displaying a plurality of behaviors, at least one of the plurality of behaviors dependent upon performance of at least one of the plurality of activities and is capable of executing the method described in accordance with FIG. 1 as well as other methods described herein. A user interface 202 generates signals indicating actions of a user. Name database 204 includes a plurality of actual names that can be accessed by processor 200. Processor 200 controls the operation of the virtual electronic pet. This control includes retrieving an actual name from the name database, receiving name signals from the user interface indicating a guessed name, comparing the actual name and the guessed name to determine if the guessed name matches the actual name, displaying at least one of the plurality of behaviors if the guessed name matches the actual name, and prohibiting further guessing of the name until a time period expires.

Processor 200 is preferably a computer processor such as a microprocessor or digital signal processor running under the control of a software program. This software program can be written in one of a variety of programming languages from machine language and assembly language or C++ to a variety of higher level programming languages. This software is stored in a program memory 216 that can include read-only-memory, random-access-memory or any of a wide variety of other tangible storage media. In some embodiments of the present invention this tangible storage medium can be sold separately as an article of manufacture in the form of a tape, disk or cartridge and be connected the virtual pet by the user. This allows the user the flexibility of loading the methods described herein selectively while allowing the hardware elements presented herein to perform other functions outside the scope of the present invention. Alternatively, hardware means that include programmable logic arrays or applications specific integrated circuits can likewise be used to implement the features described herein.

A display device 206 can also be included to provide visual feedback to the user regarding, in various embodiments, the behavior of the virtual pet, the performance of selected activities, and various graphical displays and icons to aid in the selection of letters, activities and other user inputs. In a preferred embodiment, this display device can be a liquid crystal display device, however a wide variety of other display devices, for instance cathode ray tube based displays, can likewise be used as will be apparent to one of ordinary skill in the art in the context of the teachings herein.

Clock/timer 212 provides information to the processor 200 and, in some circumstances display device 208, on the time of day and the elapsed time between various events that require timing. Random event generator 214, in communication with the processor, generates random numbers used by the processor for triggering random events such as the initiation of a new behavior. Game memory 210 provides additional storage for a plurality of status parameters necessary to define the current status of the game. Audio output device 206 can likewise be included to give audio feedback to the user to facilitate more effective use of the user interface by providing simulated speech, sound effects, background audio content and by providing a beep whenever a keypress is recorded, and further to provide notice to the user of the occurrence of one or more events in the game.

FIGS. 3–8 present flowchart representations of methods in accordance with various embodiments of the present invention. The virtual electronic pet operates in a plurality of operational modes. In a preferred embodiment, these operational modes include a start-up mode, pet-display mode, clock mode, attribute-status mode, dead-display mode and a name-guess mode.

The pet-display mode is the primary mode of operation used in playing the game associated with the virtual electronic pet. This mode displays the pet exhibiting a plurality of different behaviors. In a preferred embodiment of the present invention, these behaviors include problem behaviors: hungry, bored, dirty, sick, bad and tired. Each one of these problem behaviors have corresponding solution activities—activities that when performed, alleviate the problem behavior. The solution activities are, respectively: feeding, playing, bathing, medical treatment, punishing, and sleeping.

In addition to the problem behaviors, the preferred embodiment also includes two good behaviors for the virtual electronic pet. The first good behavior is "happy", the pet's default behavior. If none of the problem behaviors are present, the virtual electronic pet is "happy". The second good behavior is a special trick behavior, such as catching a ball, standing on its head, or balancing on one-foot. This special trick behavior is triggered only after the guessing of the virtual electronic pet's name.

In one embodiment, the user of the virtual electronic pet is able to determine the pet's current behavior or behaviors by monitoring the display device 208 and the audio output device. The display device 208 shows a graphical representation of the virtual electronic pet engaged in the current behavior or behaviors. In an alternative embodiment of the present invention, the virtual electronic pet takes the form of an character such as a stuffed animal or action figure that includes a plurality of electrical actuators that, by means of electronically controlled movements, expressions and speech, the pet can more directly perform the plurality of behaviors.

In either of these embodiments, a happy pet will appear happy to the eyes and ears of the user by engaging in happy activities such as playing and frolicking that are uniquely associated with the particular behavior. Similarly, a dirty pet will appear dirty, a sick pet will appear sick, a hungry pet will appear hungry, etc., in a manner similar to a real pet. Even if a user does not associate an observed behavior with a particular problem behavior the user can try various activities, in a manner similar to owning a real pet, to determine the activity that cures the problem. In this fashion, the user can become familiar with the pet's problem behaviors and how to correct them.

Figure 3:
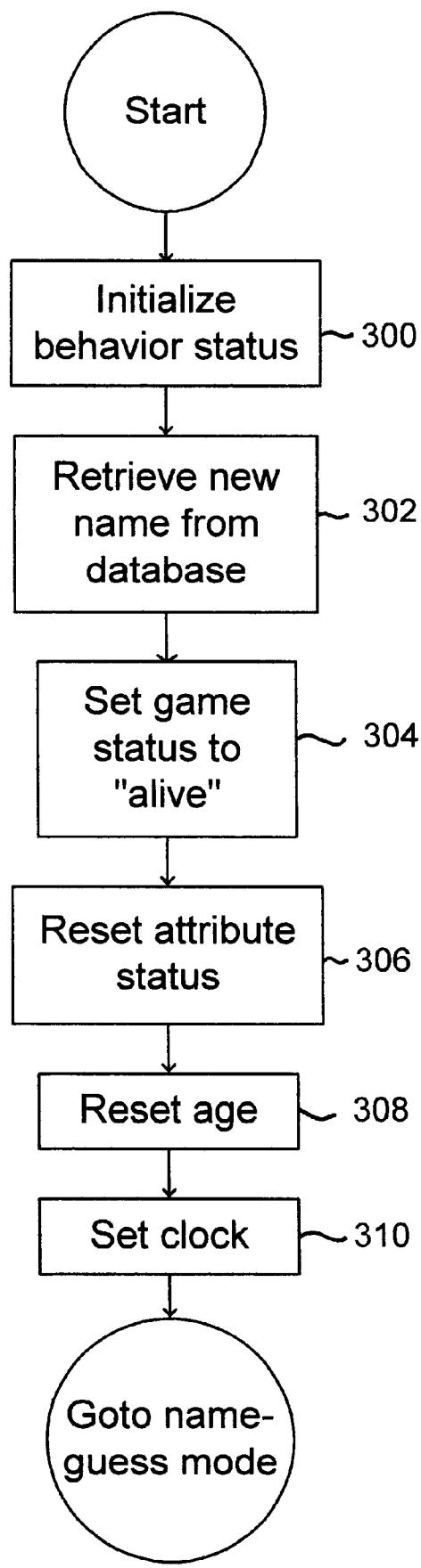
FIGS. 3–8 present flowchart representations of methods in accordance with various embodiments of the present invention.

Turning now to FIG. 3, a start-up mode of operation in accordance with a preferred embodiment is presented that is performed at the beginning of a game. The method begins in step 300 by initializing the behavior status of the pet. In a preferred embodiment of the present invention, the game memory 210 includes a status register that maintains the age, game status, behavior status, attribute status and name status by means of a plurality of logical, text and numeric variables. The behavior status is stored in an array of logical behavior variables, one for each of the behaviors, that have a value of TRUE if the behavior is present and FALSE if the behavior is not present. These values are initialized by setting each of the variables to FALSE with the exception of the happy-behavior variable. In this preferred embodiment, the virtual electronic pet starts its life with a happy behavior.

In step 302 a new name is retrieved from the name database 204. This name is stored in the status register and represents the name of the virtual electronic pet. In one embodiment of the present invention, if the previous game ended with the name of the pet not being guessed, the retrieved name is the name from the previous game. This gives the user the opportunity to guess the same name as from the prior pet. In an alternative embodiment, a new name is randomly chosen from the name database. In a preferred embodiment of the present invention the name database 204 stores a very large number of names (such as 256 or more) so as to minimize the chance that a user could guess a "new" name with minimal effort.

The game status is represented by a logical variable that has three states, ALIVE, DEAD, and NAMED. The ALIVE state corresponds to the portion of the game where the pet is alive, but where the user has not yet guessed the pets name. The DEAD state corresponds to the event in the game whereby the virtual electronic pet dies due to the lack of the proper attention, i.e. failure of the user to trigger a cure activity for a present problem behavior within a predetermined time. The NAMED state corresponds to the portion of the game after the name of the virtual electronic pet has been guessed by the user. In step 304, the game status is set to ALIVE to begin the game.

Each logical behavior variable has a corresponding activity time, also stored in the status register, that tracks the amount of time the virtual electronic pet has been in the that particular behavior mode without interruption. In this preferred embodiment, each of these activity times are initialized to zero in Step 306. As the game progresses, the activity times are incremented for each logical behavior variable that is TRUE until the corresponding behavior ceases, and the corresponding logical behavior variable is set to FALSE, at which time the activity time is also reset.

In step 308 the pet's age is reset to zero. As pet is kept alive by the actions of the user, the pet grows older as indicated by incrementing the age variable. In step 310 the user method interacts with the user in order to set the game clock at the current time and date. This clock setting interaction can take on many different forms as will be apparent to one of ordinary skill in the art.

Figure 4:
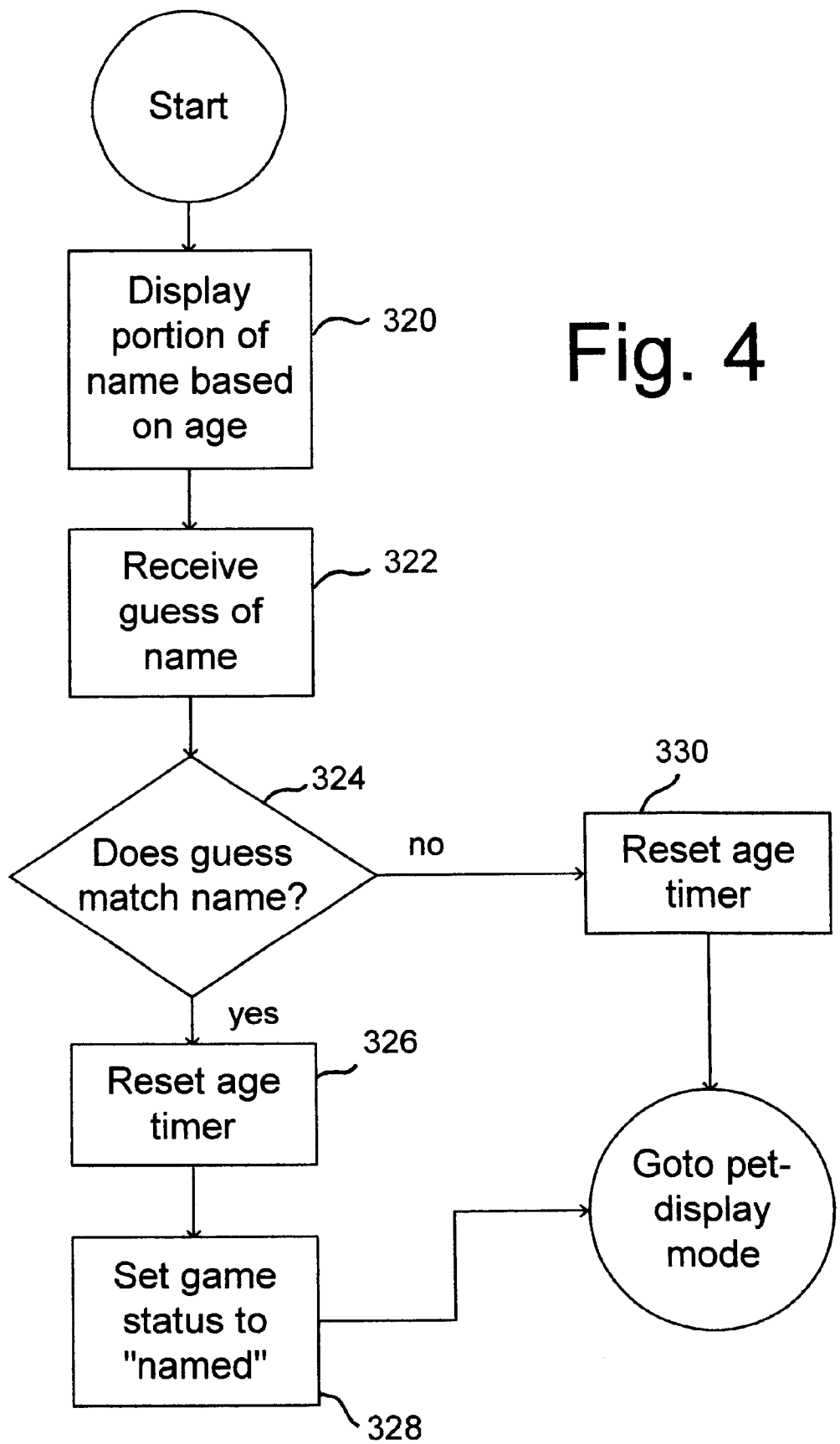

After completing the start-up mode, the method proceeds to the name-guess mode shown in FIG. 4. The method begins in step 320 by displaying a portion of the name based on the age. In a preferred embodiment, the "older" the virtual electronic pet, the more letters in the pet's name are displayed. For instance, one letter of the pet's name is displayed for each age period (game time) that the pet has lived. In the preferred embodiment of the present invention the virtual electronic pet displays the first (n) letters of the pet's actual name, however, other schemes are likewise possible within the scope of the present invention including the last (n) letters of the name or (n) randomly selected letters. As the game is initialized, the pets age is zero and the user is given no clues as the pet's name other than the number of letters. In step 322, the virtual electronic pet receives a guess for the name of the pet from the user by means of the user interface 202. The guessed name is compared to the actual name of the pet as shown in decision block 324.

If the name is correct, an age timer, a timer that is incremented by the clock/timer 212 with the progress of the game, is reset to zero. Further, the game status is set to NAMED as shown in step 328 and the method proceeds to the pet display mode. If the guessed name does not match the actual name of the pet the age timer is reset as shown in step 330 and the method proceeds to the pet-display mode. In this fashion, the guessing of the name of the pet is inhibited until a time period expires.

Figure 5:
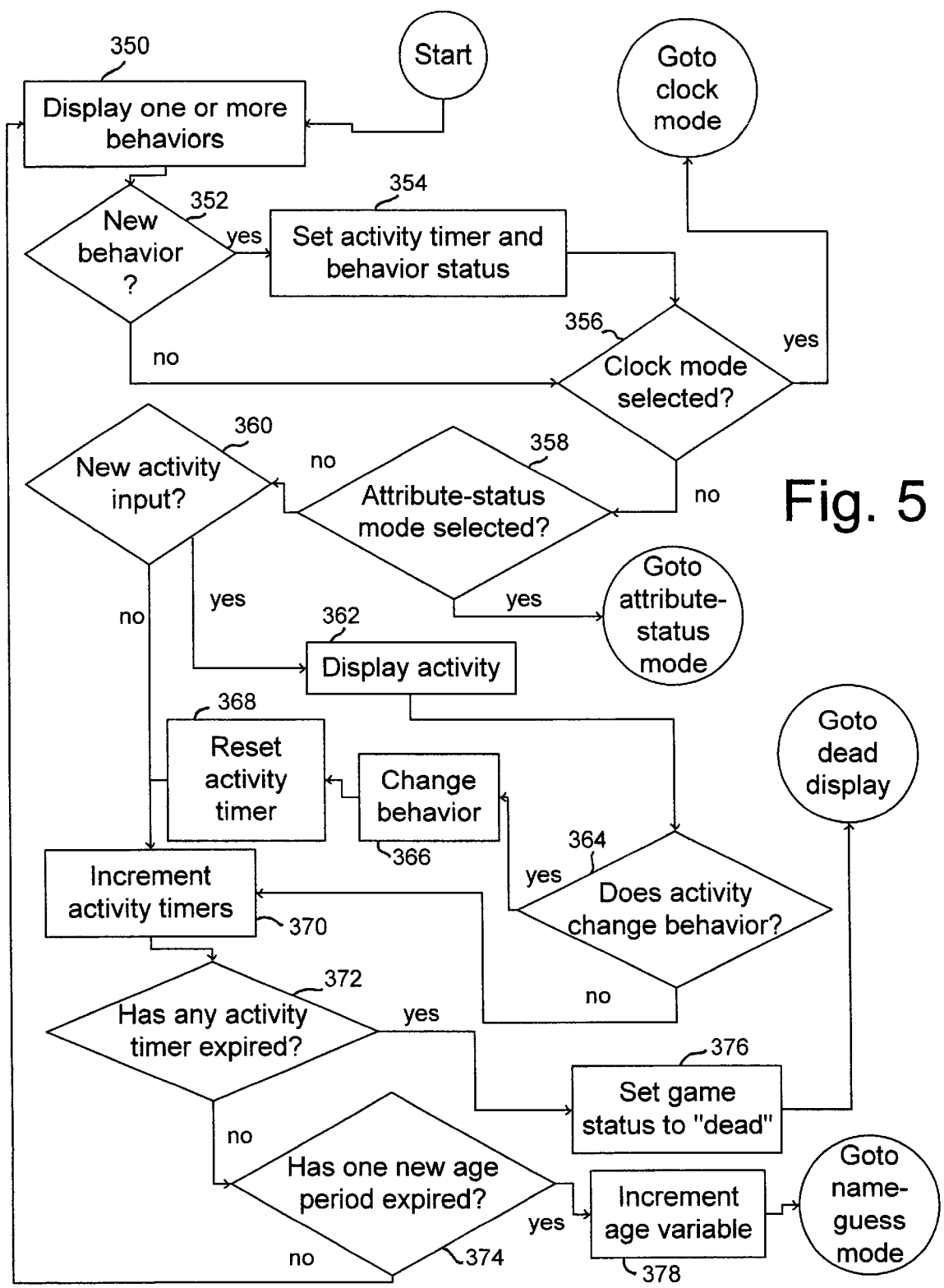

FIG. 5 presents the pet-display mode in accordance with a preferred embodiment. The method begins in step 350 by displaying one or more behaviors. If a single behavior is TRUE, that behavior is exhibited by the virtual electronic pet. If two or more behaviors are TRUE, the virtual electronic pet displays each behavior either concurrently or in sequence. In a preferred embodiment of the present invention, each behavior corresponds to a separate program subroutine that includes the processor commands that cause the display of the pet in the corresponding behavior. While these behaviors could be static conditions of the pet, in a preferred embodiment of the present invention these behaviors are displayed by a sequence of actions. In decision block 352, random event generator 214 is checked to determine if a new behavior has been triggered. In a preferred embodiment of the present invention the random event trigger is a pseudo-random number generator that generates integers between 0 and 255. The majority of the numbers correspond to a non-event however, certain numbers trigger the initiation of a new problem behavior and at least one number corresponds to a the special trick behavior. If a random number corresponding to a new problem behavior (not corresponding to an existing problem behavior) is retrieved, the corresponding behavior status variable is set to TRUE and the corresponding activity timer is reset as shown in step 354. If a random number corresponding to the special trick behavior is retrieved, the special trick behavior variable is set to TRUE only if there are no current problem behaviors and if the game status is NAMED. This gives the user of a virtual electronic pet, whose name has been correctly identified, a special surprise as well as an incentive to quickly cure any problem behaviors of the "named" pet so that the special trick behavior is possible to be triggered.

If no new behavior is triggered or the method has completed step 354, the method proceeds to decision block 356 to determine if the user has selected the clock mode. If the clock mode has been selected, the method proceeds to the clock mode, otherwise, the method proceeds to decision block 358. In decision block 358, the method determines if user has selected the attribute-status mode. If yes, the method proceeds to the attribute-status mode, if not the method proceeds to decision block 360.

In decision block 360 the method determines if the users has entered a new activity input. If a new activity input is received from the user, the method proceeds to step 362 to display the activity. The activities of the virtual electronic pet are displayed in a manner similar to the behaviors—the primary difference being that behaviors are triggered by random events and activities are triggered by the user.

In decision block 364 the method determines if the new activity changes any behavior status of the virtual electronic pet. Said another way, the method determines if the newly triggered activity is a cure to any current problem behavior (s). If the new activity cures a current problem behavior, the behavior is changed as shown in step 366. In particular, the corresponding cured behavior is set from TRUE to FALSE and the method checks to determine if there are other current problem behaviors. If there are no other current problem behaviors the "happy" behavior is set from FALSE to TRUE. In addition, the activity timer corresponding to the cured behavior is also reset as shown in step 368. If there is no new activity input, the method proceeds to step 370.

In step 370 the activity times are incremented for each current problem behavior. In decision block 372 the activity timer for each problem behavior is compared to an expiration value for that problem behavior. If any of these activity timers have expired, corresponding to a relatively long period of time (for instance, 30 minutes of game time) where the problem activity has not been cured by the user, the game status is set to DEAD as shown in step 376 and the method proceeds to the dead-display mode.

If the virtual electronic pet is still alive, the age timer is checked to determine if one new age period has elapsed as shown in decision block 374. If yes, the age variable is incremented as shown in step 378 and the method proceeds to the name guess mode. If not, the method returns to step 350. In a preferred embodiment of the present invention the age period is eight hours of game time, however, other time periods are likewise possible.

In accordance with this example, the virtual electronic pet "ages" one year for each eight hours of game time that the pet is kept alive. The user is given the opportunity to guess the name of the pet at the beginning of the game and after each eight hours of successful play. If the name of the pet is "spot", and if one letter of the name is given to the user at the end of each pet year of life, and further if the letters are presented to the user sequentially starting from the first letter rather than randomly, the user will be shown "s ___" after one year (eight hours of game life) and given the opportunity to guess the name. If the name was not successfully guessed at age one, after the pet is two years old, the user is presented "s p ___" and given a third opportunity to guess the name. If the name was not successfully guessed at age two, after the pet is three years old, the user is presented "s p o _" and given a fourth opportunity to guess the name. If the name was not successfully guessed at age three, after the pet is four years old, the user is presented "s p o t". Since the guessed name matches the actual name without input from the user, there is no need for further guessing and the status of the game is changed to the NAMED status.

Figure 6:
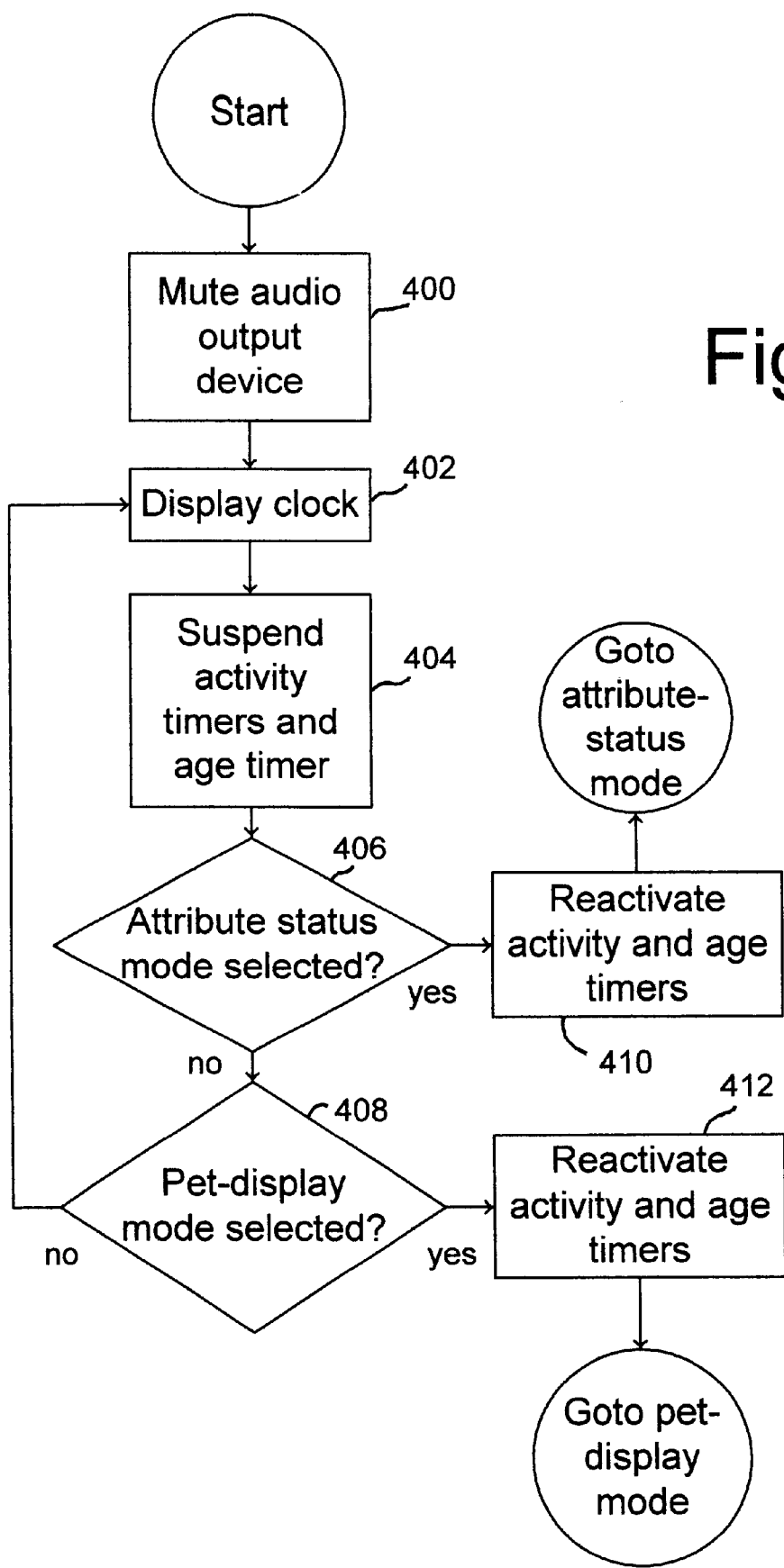

FIG. 6 presents the clock-display mode in accordance with a preferred embodiment. In this mode of operation the play of the game is suspended in order for the user to perform other activities without interruption by the game. In step 400 the audio output device 206 is muted and the current time is displayed on a real-time clock as shown in step 402. The activity timers and age timer are suspended as shown in step 404.

In decision block 406 the method determines if the user has selected the attribute-status mode. Is yes, the activity timers and age timer are reactivated as shown in step 410 and the method proceeds to the attribute-status mode. If not, the method checks to see if the user has selected the pet-display mode as shown in decision block 408. If yes, the method reactivates the activity timers and the age timer as shown in step 412 and proceeds to the pet display mode. If not, the method returns to the clock-display mode.

Figure 7:
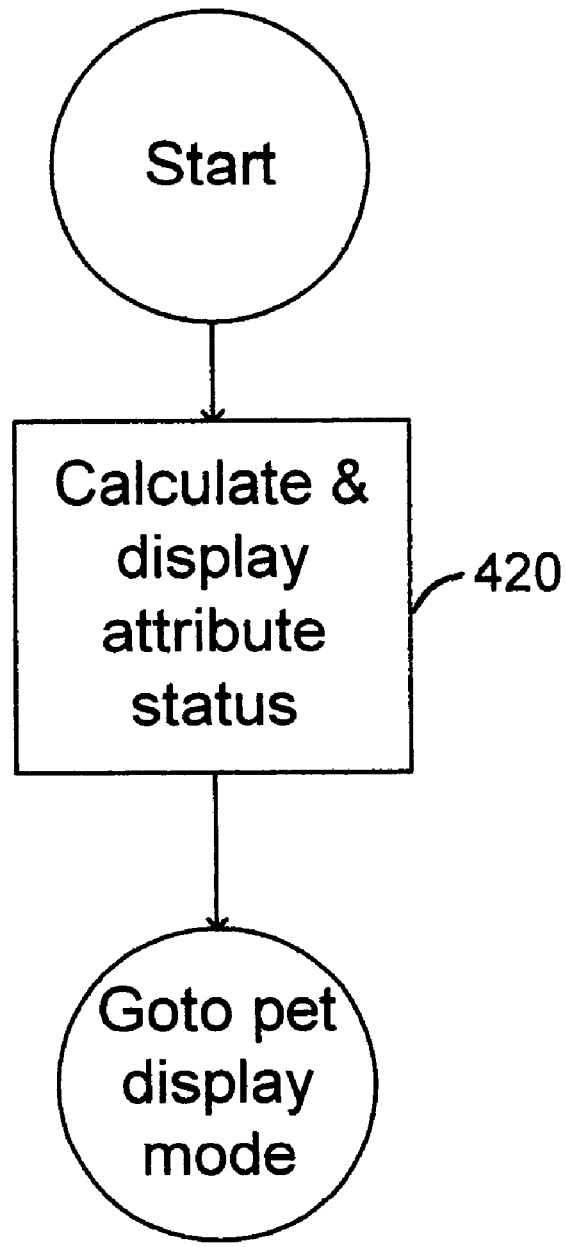

FIG. 7 presents the attribute-status mode in accordance with a preferred embodiment of the present invention. In step 420, the current age of the pet is displayed and the overall happiness of the pet is calculated and displayed. The happiness of the pet is calculated from quotient of the current value of the activity timer for the "happy" behavior and the age of the pet (normalized by multiplying by the amount of game time for each age period). The method continues by proceeding to the pet-display mode.

Figure 8:
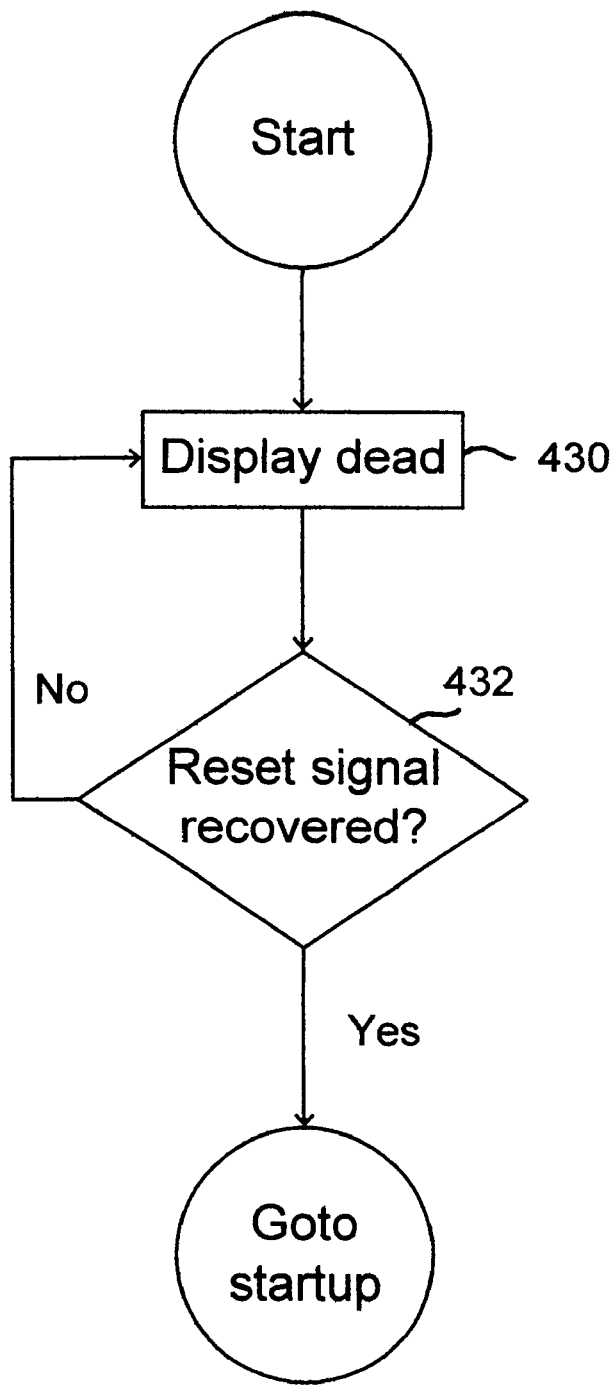

FIG. 8 presents the dead-display mode in accordance with a preferred embodiment of the present invention. The method begins by displaying a dead display—showing the pet in a dead mode such as an angel (or as no longer engaging in any behavior or activity) as shown in block 430. In decision block 432 the method determines if a reset signal has been received from the user indicating that the user wishes to begin another game. If no, the method returns to step 430. If yes, the method proceeds to start-up mode.

Figure 9:
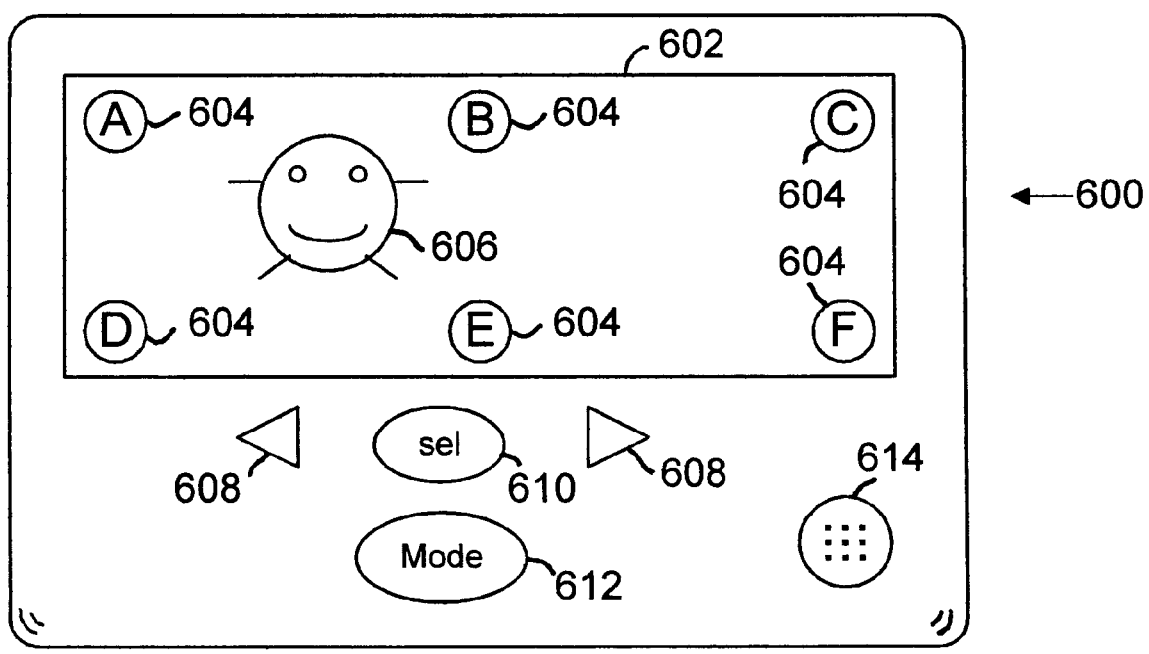
FIG. 9 presents a pictorial representation of a virtual electronic pet in accordance with the present invention.

FIG. 9 presents a pictorial representation of a virtual electronic pet in accordance with the present invention. Virtual electronic pet 600 includes a user interface that includes display device 602, a keypad including up and down arrow keys 608, select key 610 and mode key 612, as well as audio output device 614. In a preferred embodiment, the display device 602 is an liquid-crystal display known to one of ordinary skill in the art. Display device 602 is capable of displaying the pet 606 engaging in a plurality of activities and exhibiting a plurality of behaviors as described herein. Icons 604, represented illustratively as letters, aid the user in selecting from the plurality of activities for the pet to perform. While the icons 604 are represented as letters of the alphabet, in other embodiments of the present invention icons 604 graphically represent each of the activities to be performed.

In operation, the user can select between the clock mode, the attribute-status mode and the pet-display mode by toggling the mode key 612. A desired activity can be selected by sequentially highlighting ones of the plurality of icons 604 until the icon corresponding to the desired activity is highlighted. Pressing the select key 610 serves to select the highlighted activity and triggers its performance by the pet.

Figure 10:
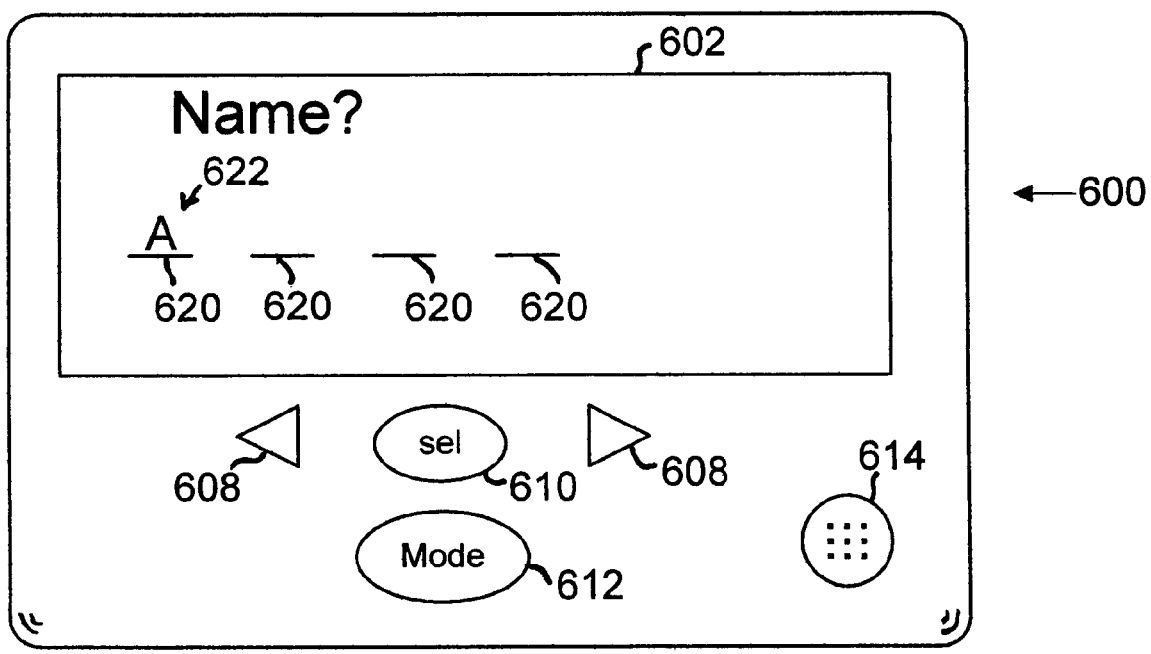
FIG. 10 presents a pictorial view of the virtual electronic pet of FIG. 9 in an example of the name-guess mode in accordance with the present invention.

FIG. 10 presents a pictorial view of the virtual electronic pet of FIG. 9 in an example of the name-guess mode in accordance with the present invention. In this embodiment, display device 602 of virtual electronic pet 600 queries the user to guess the name. Blank spaces 620 provide the user with the number of letters to be guessed. Arrow 622 indicates to the user the letter to be selected. In operation, in accordance with this example, the first letter is displayed initially as an "A". The user selects the desired first letter by toggling the up and down keys 608 to sequence through the alphabet until the desired letter is reached. Pressing the select key 610 locks-in the guess for that letter and moves the arrow to the next empty space 620. The process is repeated for the second letter. After each of the letters have been selected, the virtual electronic pet 600 in accordance with the methods previously described, compares the guessed name versus the actual name to determine if they match.

Figure 11:
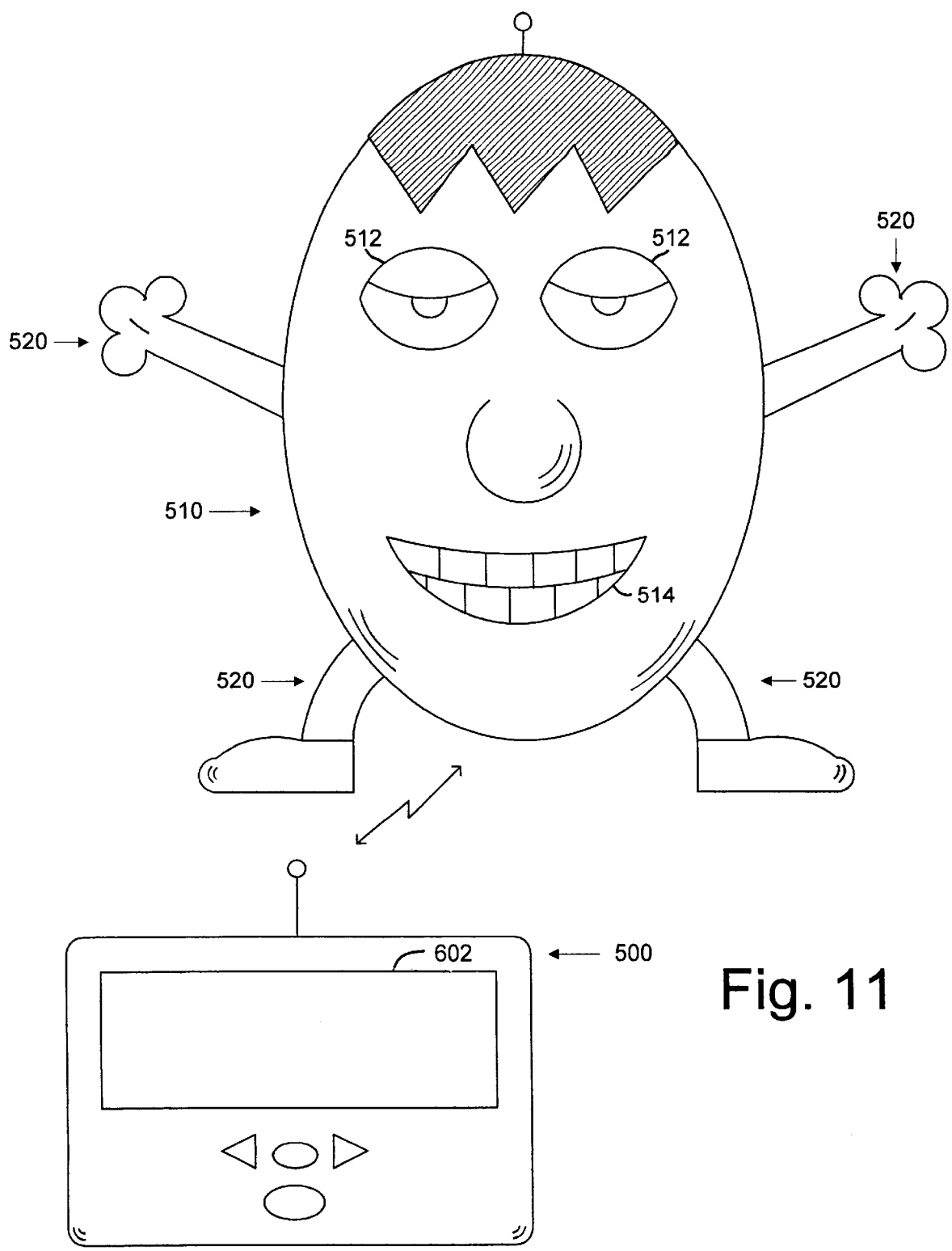
FIG. 11 presents a virtual electronic pet in accordance with an alternative embodiment of the present invention.

FIG. 11 presents a virtual electronic pet in accordance with an alternative embodiment of the present invention. In this embodiment, character 510 encloses a portion of the virtual electronic pet that takes the form of a character that, by means of electronically controlled movements, expressions and speech can directly perform the activities and behaviors such as those previously described. Eyes 512 and mouth 514 are capable of movement that can be synchronized with speech provided by the pet's audio output device 206. Limbs 520 are optionally capable of movement and can be used, in addition to the expression and speech, to perform the various activities and behaviors.

Remote control unit 500 functions in a manner similar to virtual electronic pet 600 except that, instead of displaying the behaviors and activities of the pet on display device 602, the character 510 displays these behaviors and activities directly. Remote control unit 500 and character 510 each include a transceiver for communicating with the other unit. In one embodiment of the present invention the character 510 encloses the processor 200, a first transceiver and the name database 204, and the remote control unit 500 provides a second enclosure, for housing a second transceiver and the user interface 202 remote from the first enclosure. However, other allocations of the components of FIG. 2 between the first and second enclosures are possible with, in other embodiments, a processor 200 being enclosed in each of the two units with an appropriate division of functions performed.

While various embodiments of the present invention have been described in the context of a dedicated device, the present invention could likewise be implemented on a PC, laptop, personal digital assistant or similar device.

It should be obvious to one of ordinary skill in the art that many of the elements used in the various embodiments of the present invention are well suited for implementation on a processor such as a microprocessor, a digital signal processor or a micro controller. Likewise these elements could be performed in hardware by a custom integrated circuit, ASIC, programmable logic array or similar devices.

While specific embodiments of the present invention have been shown and described, it will be apparent to those skilled in the art that the disclosed invention may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. A virtual electronic pet comprising:
   a user interface for generating signals indicating actions of a user;
   a name database of actual names;
   a processor, in communication with the user interface and the name database, for retrieving an actual name from the name database, receiving name signals from the user interface indicating a guessed name, comparing the actual name and the guessed name to determine if the guessed name matches the actual name, displaying at least one of the plurality of behaviors if the guessed name matches the actual name, and prohibiting further guessing of the name until a time period expires;
   wherein the virtual electronic pet is capable of performing a plurality of activities and capable of displaying a plurality of behaviors, at least one of the plurality of behaviors dependent upon performance of at least one of the plurality of activities.

2. The virtual electronic pet of claim 1 further wherein at least one of the plurality of behaviors indicate an alive mode and wherein the name signals are received only if the virtual electronic pet is in the alive mode.

3. The virtual electronic pet of claim 1 further comprising a display device and wherein the processor provides one or more letters of the actual name for display on the display device prior to receiving the name signals.

4. The virtual electronic pet of claim 3 further comprising:

a clock/timer in communication with the processor;

wherein the processor uses the clock/timer to determine an age dependent upon the amount of time the virtual electronic pet has been in an alive mode.

5. The virtual electronic pet of claim 4 displays a number of letters dependent upon the age of the virtual electronic pet.

6. The virtual electronic pet of claim 1 that is displayed only if the actual name matches the guessed name.

7. The virtual electronic pet of claim 1 further comprising:

a random event generator, in communication with the processor, for triggering a new behavior; and a game memory for storing a plurality of status parameters.

8. The virtual electronic pet of claim 1 further comprising:

a first transceiver coupled to the processor; and a second transceiver, coupled to the user interface, for communicating with the first transceiver and providing a signaling link between the processor and the user interface.

9. The virtual pet of claim 8 further comprising:

a first enclosure for housing the processor, the first transceiver and the name database; and a second enclosure, for housing the second transceiver and the user interface a remote distance from the first enclosure.

10. A virtual electronic pet comprising:

a user interface for generating activity signals and name signals in response to actions of a user;

a name database of actual names;

a display device;

a clock/timer;

a random event generator for generating a plurality of new behavior triggers;

a game memory for storing a plurality of status parameters; and a processor, in communication with the clock/timer, the random event generator, the game memory, the display device, the user interface and the name database, for displaying at least one of a plurality of behaviors in response to at least one of the plurality of new behavior triggers, for displaying at least one of a plurality of activities in response to activity signals received from the user interface, for retrieving an actual name from a name database, determining an age using the clock/timer; displaying a number of letters of the actual name on the display device, the number of letters dependent on the age, the processor also for receiving the name signals from the user interface indicating a guessed name, comparing the actual name and the guessed name to determine if the guessed name matches the actual name, displaying at least one of the plurality of behaviors only if the guessed name matches the actual name, and prohibiting further guessing of the name until a time period expires;

wherein at least one of the plurality of behaviors indicates an alive mode and wherein the name signals are received only if the virtual electronic pet is in the alive mode.

11. In a virtual electronic pet having a user interface, the virtual electronic pet capable of performing a plurality of activities and capable of displaying a plurality of behaviors, at least one of the plurality of behaviors dependent upon performance of at least one of the plurality of activities, a method comprising the steps of:

retrieving an actual name from a name database;

generating name signals, indicating a guessed name, in response to the actions of a user;

comparing the actual name and the guessed name to determine if the guessed name matches the actual name;

displaying at least one of the plurality of behaviors if the guessed name matches the actual name; and prohibiting further guessing of the name until a time period expires.

12. The method of claim 11 wherein at least one of the plurality of behaviors are dependent upon an alive mode and wherein the step of receiving name signals is performed only if the virtual electronic pet is in the alive mode.

13. The method of claim 11 further comprising the step of:

providing the user one or more letters of the actual name prior to the step of receiving the name signals.

14. The method of claim 13 wherein the virtual electronic pet has an alive mode, and an age that is dependent upon the amount of time the virtual electronic pet has been in the alive mode, and wherein the step of providing the user one or more letters provides a number of letters dependent upon the age of the virtual electronic pet.

15. The method of claim 11 wherein the at least one of the plurality of behaviors in the step of displaying includes a behavior that is displayed only if the actual name matches the guessed name.

\* \* \* \* \*